March 21, 1944.   C. J. HOLSLAG   2,344,775
MEANS FOR SAVING WELDING ELECTRODE MATERIAL
Filed May 30, 1942
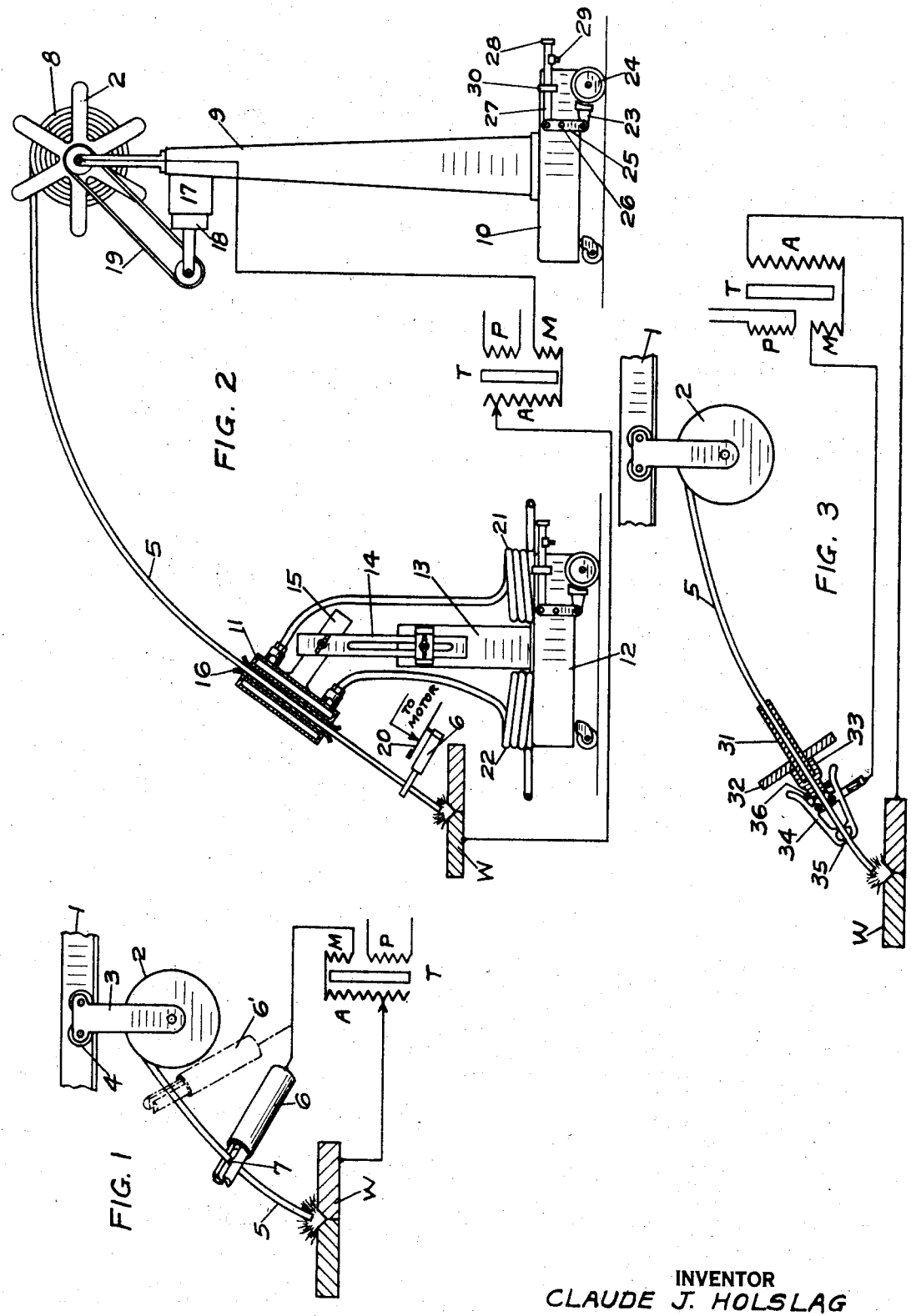
INVENTOR
CLAUDE J. HOLSLAG
BY
A. D. T. Libby
ATTORNEY Patented Mar. 21, 1944

2,344,775

UNITED STATES PATENT OFFICE 2,344,775

MEANS FOR SAVING WELDING ELECTRODE MATERIAL

Claude J. Holslag, South Orange, N. J., assignor to Electric Arc, Inc., Newark, N. J.

Application May 30, 1942, Serial No. 445,121

1 Claim. (Cl. 219—8)

This invention relates to means or a process for eliminating the waste of electrode material used in manual metallic arc-welding.

Substantially all metallic arc-welding today is done with covered or coated electrodes having a length of from fourteen to twenty inches, although in the very early days of metallic arc-welding much longer electrodes were used to some extent. In coating electrodes, one end is left bare for approximately one inch or more to receive the welding handle that is connected to one side of the source of welding current, the other side of the source being connected to the workpiece or parts being welded. During the welding operation the metallic electrode is used up down to a point adjacent the portion that is gripped by the welding handle and this part, which cannot be introduced into the arc, is thrown aside and is usually thrown away entirely or goes into the scrap pile where it may or may not be recovered.

At the present time, with the enormous production going on in shipyards, tank shops and thousands of fabricating plants, factories and repair shops, thousands of tons of electrodes are used daily and the loss of these electrode ends has become an important item in the conservation of materials. While the loss of these stub ends of electrodes is enormous at the present time, it has always presented what seemed to be an unsolvable problem.

It is therefore the principal object of my invention to disclose and claim herein a general solution of the said problem, and this solution will be readily understood by reference to the annexed drawing, wherein:

Figure 1 illustrates, somewhat diagrammatically, one form in which the problem may be solved.

Figure 2 illustrates other means of carrying my invention into practice.

Figure 3 illustrates a further modification.

In the drawing, 1 is an overhead track on which is mounted a reel 2 having the necessary support members 3, only one of which is shown, carrying rollers 4 supported on the track 1 so that the reel 2 may be moved along the track as required. The reel 2 carries a coil of wire, the free end 5 of which is adapted to be engaged by a welding handle 6 having jaws with special means 7 for piercing or cutting through the coating on the rod 5 so as to make electrical contact therewith. A slight rotary movement by the operator of the welding tool enhances the contact-engaging ability of the said means 7. The jaws of the handle are connected in the usual way to a source of welding current such as a transformer T having a primary winding P connected to a suitable source of current, a main secondary M and an auxiliary secondary A which may have the winding tapped to get the desired voltage for supplying current to the welding handle. The workpiece W is connected to one terminal of the transformer T. It should be understood that the coil or reel of welding wire is carried in such a position to allow the wire to be easily pulled from the coil or reel by the operator through the medium of the welding handle 6, if some auxiliary drive or feed mechanism is not used.

I have found from past years of experience that a curved electrode is easier to manipulate than a straight electrode which is all that the welding industry has been used to, and the curve which the welding wire takes coming from the reel down to the work, as guided by the operator through the medium of the welding handle, is more easily sustained by the operator. Preferably a second welding handle 6' is used so that the operator may, with his free hand, apply one welding tool in back of the one which is used to guide the electrode and sustain the arc while the arc is running so that there is no interruption in the welding operation. Thus a continuous manual process of welding is obtained.

In Figure 2 I have shown the coil of wire 8 on a reel 2 that is mounted on a stand 9 and preferably insulated therefrom, the stand 9 being carried by a small truck or carrier 10. The inner end of the coil 8 is electrically connected to the reel; or, through a suitable connection, it or the reel, or both are connected to one side of the transformer T, the other side of which is connected to the work W as in Figure 1.

In this arrangement, the welding current passes through the wire of the coil and in some cases, depending on the size of the wire and the current required, the wire may become too hot before it reaches the welding position, and in order to eliminate this difficulty a cooling chamber 11 is located just adjacent the welder. The chamber 11 is carried on a small stand or portable truck 12 through the medium of a support 13 carrying an adjustable arm 14 to which is swiveled a support member 15 carrying the cooling chamber 11. In this arrangement the cooling chamber 11 may be set at any angle and proper position whereby it may also guide the welding rod or wire 5 through a sleeve 16 preferably of strong high heat-resisting and insulating material carried by the cooling chamber 11. The operator has a welding tool or handle 6, the same as in Figure 1, for directing and maintaining the arc at the work. In this case, the welding rod or wire 5 may be fed by a motor 17 having a suitable gear reduction 18 integral therewith which is connected in any suitable manner as by a belt or chain 19 with the reel 2.

The operation of the motor may be controlled by a foot switch at the welding operator's position, or by a switch such as 20 on his welding handle or tool 6. Since the welding rod or wire is being fed to the arc in a curvilinear path, the operator will have a certain amount of slack or take-up in the welding wire which will allow a certain amount of compensation for any overrun of the feed motor.

The carrier truck 12 may carry convolutions 21 of a suitable hose for carrying cooling fluid to the cooling chamber 11. An outlet hose 22 may also be carried on the truck 12 so that if it is necessary to move the truck, one or more convolutions of the two hose lines may be utilized to set the truck 12 wherever desired. Each of the trucks 10 and 12 is preferably provided with a brake 23 to engage one or more of the wheels 24 to lock the trucks in any set position. The brake 23 is operated by a lever 25 pivoted at 26 to some part of the truck 10. Pivotally connected to the lever 25 is a control rod 27 having a push button 28 for operating the rod 27. The rod 27 preferably carries a catch 29 which is adapted to engage a bracket 30 in a manner to hold the brake 23 in locked position.

In Figure 3 the arrangement is somewhat as indicated in Figure 1, but the guide and support member for use by the operator in handling the welding rod or wire 5 consists of a sleeve 31 preferably of strong insulating material which carries a guard plate 32. Mounted on one end of the sleeve 31, in any satisfactory manner, is a metallic member 33 preferably clamped to the sleeve 31. To the metallic member 33 is pivotally mounted a pair of grips 34 each having sharp engagement points 35 for piercing the flux coating on the electrode 5. Springs 36 are used to force the grips into engagement with the electrode.

As the electrode is consumed by the arc, the operator merely loosens the grip by pressing inwardly on the members 34 to release the grip on the electrode, and the sleeve 31 is then moved backward toward the coil or reel 2 to a new position, and the arc is restarted, and so on until the entire coil, which is made up of a large number of running feet, has been used up, when a new coil of wire is put in position and one end thereof is welded to the end of the used-up coil, whereby no welding wire whatever is lost. In place of the means for carrying the coil or reel 2 as shown in Figure 3, a portable stand 9, such as shown in Figure 2, may be used. Likewise, the various details may be varied over a considerable range; for example, instead of the current being connected to the coil 8 or the reel 2 as heretofore described with respect to Figure 2, current may be carried to the rod or wire 5 by a suitable type of motor-driven rolls which are adapted to pierce the flux coating on the wire to convey current thereto; or the wire may be of the partially coated type such as shown in my Patent 1,528,876, issued March 10, 1925. If the flux coating has current-carrying characteristics, then conveying the current to the electrode is easier than where the flux coating is insulating in character.

Furthermore, in the present process, when the wire is fed from the coil or reel with a motor, which may be done in Figures 1 and 3, as well as in the arrangement of Figure 2, all the operator has to do is to guide the electrode at the arc position, and the operator can work with his elbow pressed rigidly against his side, leaving his hand free to move steadily and firmly, which is a great improvement over trying to move both hand and elbow to keep a straight electrode even with the work; this greatly reduces the operator's fatigue. Where the electrode is fed to the work by a motor, as may be done in the arrangements of Figures 1 and 3, rubber rollers may be used in engagement with the coated electrode.

While I have illustrated an alternating current transformer of the type shown in my Patent 1,305,363 as the source of welding current, any other satisfactory type of A. C. welding machine, or a D. C. welding machine may be used.

From what has been said it will be seen that a large amount of welding rod or wire can be saved or salvaged by the means or process herein described which differs from automatic machine welding in that the present means or process must be manually controlled at the arc by an operator.

What I claim is:

In manual metallic arc-welding, means for saving electrode material which includes a long length of welding rod or wire on a reel, a portable stand carrying the reel, one terminal of a source of welding current being connected to the rod or wire on the reel and the other terminal of said current source being connected to the work, means for guiding the wire in a curvilinear path to the welding operator, said means including a second portable stand and a combined sleeve and cooling chamber held by the stand at an adjustable angle to insure the curvilinear path of movement of the rod or wire, means carried by the second stand for passing cooling fluid to and from said cooling chamber, and means under control of the welding operator for feeding the rod or wire from the reel as desired at the arc.

CLAUDE J. HOLSLAG.